(12) United States Patent
Bhatt et al.

(10) Patent No.: US 7,899,794 B2
(45) Date of Patent: Mar. 1, 2011

(54) OPTIMIZING LOCK ACQUISITION ON TRANSACTION LOGS

(75) Inventors: Vadiraja Bhatt, Bangalore (IN); Nitin Verma, Indore (IN); Fei Zhou, Glenview, IL (US)

(73) Assignee: Sybase, Inc., Dublin, CA (US)

( * ) Notice: Subject to any disclaimer, the term of this patent is extended or adjusted under 35 U.S.C. 154(b) by 441 days.

(21) Appl. No.: 12/052,417

(22) Filed: Mar. 20, 2008

(65) Prior Publication Data

US 2009/0240739 A1    Sep. 24, 2009

(51) Int. Cl.
*G06F 17/00*    (2006.01)
(52) U.S. Cl. ......... 707/682; 707/672; 707/674; 711/161; 714/2; 714/748
(58) Field of Classification Search .......... None
See application file for complete search history.

(56) References Cited

U.S. PATENT DOCUMENTS

| | | | | |
|---|---|---|---|---|
| 6,721,765 B2 * | 4/2004 | Ghosh et al. | .......... | 1/1 |
| 7,107,294 B2 * | 9/2006 | Romanufa et al. | .......... | 1/1 |
| 7,783,610 B2 * | 8/2010 | Lin et al. | .......... | 707/689 |

* cited by examiner

*Primary Examiner* — Apu M Mofiz
*Assistant Examiner* — Hung D Le
(74) *Attorney, Agent, or Firm* — Sterne, Kessler, Goldstein & Fox PLLC (57) ABSTRACT

A system, method, and computer program product for improving physical lock acquisition for database transaction logs are described herein. In an embodiment, the method operates by receiving a request for a transaction log page and determining whether a requested log page is newly-allocated or already exists. A determination is made regarding whether the last log page is being modified. A physical lock is taken on the requested log page when it has been determined that the requested log page is not newly-allocated and that the last log page is not being modified. Operations on the last log page are synchronized without a physical lock when it is determined that the requested log page is newly-allocated or that the last log page is being modified.

20 Claims, 9 Drawing Sheets

Deferred log update and a read-only log scanner

FIG. 6

Taking a Physical lock on a partially-filled transaction log page

FIG. 7

Taking a Physical lock on a partially-filled transaction log page

OPTIMIZING LOCK ACQUISITION ON TRANSACTION LOGS

FIELD OF THE INVENTION

The present invention relates generally to databases and, more particularly, to optimizing acquisition of physical locks in database transaction logs to guarantee cache coherency.

BACKGROUND OF THE INVENTION

Acquiring physical locks on a transaction log of a database is a resource-intensive operation and has performance implications in terms of database scalability. Database applications rely heavily on acquiring physical locks in database transaction logs in order to guarantee cache coherency.

As the number of nodes increase with large database management system (DBMS) applications, physical lock acquisition becomes more expensive.

As the number of nodes in a database environment increases, physical lock acquisition and management become more expensive. When a serialized transaction log stream is shared amongst many nodes, a performance bottleneck can arise. The resources needed to acquire and manage a large number of transaction log locks across multiple nodes can limit the ability to scale or grow a database. As distributed, multi-node databases are growing in size and complexity, what is needed are methods and systems that efficiently acquire and manage transaction log locks.

Transaction logs are critical resources when it comes to growing or scaling databases. There have been several features and enhancements done in the past to improve the performance of transaction logging. Many database management system (DBMS) platforms with a cluster comprised of multiple nodes employ shared disks to improve data reliability and to enable features such as database mirroring and data replication. When shared disks are used, database transaction logs are even more critical as they are the single point of contention between the nodes in the cluster.

Currently in the art, physical locks are taken on all data and transaction log pages of a database. There is overhead associated with taking physical locks on data pages. In order to maintain buffer cache coherency and to synchronize access to data and transaction log pages across multiple nodes, a module must take physical locks. The steps involved every time a physical lock is taken on a page often include the following: a requester node takes the cache spinlock, setting/unsetting the cluster-specific status bits pertaining to a group of buffers which are controlled together in the cache. A MASS unit may be attached to control a group of buffers. The specific physical lock request goes to Cluster Lock Manager (CLM) module via a call to the lock_multiple_physical( ) routine, the CLM sends a blocking asynchronous trap (BAST) request to the BCM thread of the owner node. A BAST request is an asynchronous event issued by a lock manager that manages physical lock requests. After the BAST request is issued, the request is queued, the owner downgrades its lock as needed, and the owner transfers the transaction log page to the requester. Each of these steps requires some execution time, and thus impact system performance. There is also space overhead as the physical locks are retention locks. Each successfully taken physical lock consumes a memory location permanently.

Furthermore, each time a physical lock is taken; it adds a LOCKREC element into the grant/convert queue of the CLM, which in turn increases the search time for a given LOCKREC. Accordingly, what is desired is a means of efficiently acquiring and managing transaction log locks. What is further needed is a protocol that enables more efficient physical lock acquisition for transaction log pages. What is further desired are systems and methods that help eliminate expensive operations during database transaction logging and enables better database scaling.

Accordingly, what is needed are methods, systems, and computer program products that optimize database transaction log lock acquisition. What is further needed are methods, systems, and computer program products that optimize transaction log lock optimization by avoiding physical lock acquisition for new transaction log page allocations, including the last transaction log page.

BRIEF SUMMARY OF THE INVENTION

The present invention includes methods, systems, and computer program products that optimize transaction log lock acquisition. The method includes the step of appending to a transaction log without acquiring physical locks during new log allocations and on the last transaction log page. The present invention further includes a new protocol used to acquire physical lock on transaction log pages. Significant performance improvements are possible through use of the new protocol. The present invention includes methods, systems, and computer program products that optimize transaction log lock acquisition by minimizing the need to take physical locks on transaction log streams. The present invention optimizes database transaction logging and enables scaling of databases by reducing resource-intensive operations during logging.

According to an embodiment of the invention, operations on the Last transaction log Page (LLP) are synchronized through the Last log object lock (LLOL) at the node level and the Append Log Semaphore at the task level. The method further includes the step of scanning the transaction log to acquire physical locks on the transaction log pages and following the physical lock acquisition both read-only scanners (such as Database consistency check/dbcc log, triggers) and scanners that modify in between log pages (i.e., deferred update, dump transaction, checkpoint, etc). The method divides log scanners into two categories: read-only scanners such as DBCC LOG operations; and scanners that update intermediate log pages such as deferred-update operations. According to an embodiment, log scanners do not allocate new log pages or append to the transaction log.

In accordance with an embodiment of the invention, the method synchronizes read/write operations on any other transaction log page through physical locks. According to an embodiment, scanners that also modify the transaction log at intermediate points (e.g. deferred updates and dump tran operations that modify intermediate pages in the log) will additionally take LLOL when modifying particularly the last transaction log page.

The invention also includes a computer program product comprising a computer usable medium having computer program logic recorded thereon for enabling a processor to optimize database transaction log lock acquisition. The computer program logic avoids physical lock acquisition for new transaction log page allocations including the last transaction log page.

The invention additionally includes a system capable of optimizing database transaction log lock acquisition. The system includes a first module to synchronize operations on the LLP through the LLOL (at the node level) and Append Log Semaphore (at the task level), a second module to take physical locks on the transaction log pages and subsequently synchronize through physical locks the read/write operations on any other log page for read-only scanners (dbcc log, triggers) and scanners that modify in between log pages (deferred update, dump tran, checkpoint, etc), and a third module to take the LLOL when scanners who also modify the transaction log at intermediate pages (e.g., deferred update and dump tran operations that modify middle log pages) modify the last transaction log page.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the relevant art to make and use the invention.

The present invention will now be described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION 1.0 Last Transaction Log Page Synchronization

As used herein, a "physical lock" refers to a distributed lock taken in a cluster environment in order to guarantee buffer cache coherency. The present invention optimizes acquisition and synchronization of the last log page in a database transaction log.

"Databases" as used herein are collections of one or more data objects. Data objects may include, but are not limited to, any audio, graphical, video, text, or written work encoded in digital form and encapsulated in a computer structure, such as a table, a database record, a data store record, a column in a database record, a field in a database record, a file, a message, or a shared memory object, that a software program can access and manipulate.

A transaction log as used herein refers to the transaction log of a database. A transaction log is a history of actions executed by a database management system (DBMS) in order to guarantee the Atomicity, Consistency, Isolation, and Durability (ACID) properties of database transactions in the event of database server crashes, unexpected database shutdowns, or hardware failures. Physically, a transaction log is a file or collection of updates done to the database that is stored in stable storage.

If, after a start, the database is found in an inconsistent state or not been shut down properly, a DBMS reviews the transaction logs for uncommitted transactions and 'rolls back' changes made by these transactions. All transactions that have been previously committed, but whose changes were not yet materialized or 'posted' in the database records are re-applied. In this way, transaction logs ensure atomicity and durability of transactions.

1.1 Characteristics of Transaction Logs

A transaction log is a special object that grows serially without other data manipulation language (DML) operations such as database record updates and deletes. Transaction log pages can be de-allocated and truncated through specific database conditions such as a dump transaction log command or when the database reaches a checkpoint (either through an explicit command or as a result of database records all being saved and committed). Before writing transaction log records, tasks acquire an end of log semaphore. An end of log semaphore is a lock on the last transaction log object. The last transaction log object knows where the last transaction log page (LLP) is located (i.e., address in memory or on disk). The owner node of last log object lock (LLOL) flushes the dirty log chain before transferring the LLOL to the requester node. Transaction log pages need to be scanned in read-only mode for transaction aborts, database consistency checking (dbcc) of the transaction log, or similar operations. No updates to the transaction log pages are performed when they are scanned in read-only mode.

1.2 Task Synchronization When Writing to the Transaction Log

Access to the transaction log must be synchronized on the node level and on the task level. In accordance with embodiments of the present invention, both levels of synchronization are described below.

1.2.1 Node Level Synchronization

At the node level, a cluster node that needs to append transaction log records onto the transaction log must take a lock on the last transaction log object. The Last transaction log object is an entity which knows where the last transaction log page is. When the request for last log object lock (LLOL) is made, it goes to the current owner of the LLOL. After current owner is done with its transaction logging, it flushes the dirty log chain to disk and downgrades the LLOL, so that the requester node can now begin writing its transaction log.

1.2.2 Task Level Synchronization

At the task level on a particular node, access to the transaction log is synchronized via use of a semaphore. A semaphore is a protected variable which is used to restrict access to the shared transaction log resource. According to an embodiment of the present invention, the semaphore used to synchronize access to the transaction log may be one or more of a counting semaphore, a binary semaphore, a flag, a variable, or a mutex.

In accordance with an embodiment of the present invention, an Append Log Semaphore is used to synchronize access to transaction log. According to an embodiment, a task writes to its transaction log by flushing its private log cache (PLC) and taking the append log semaphore. The Append Log Semaphore may also be checked at the end of transaction log synchronization. If a task can not take or obtain the append log semaphore immediately, it waits until the task that currently has the semaphore is done with its operations (i.e., done writing to end of the transaction log). In accordance with an embodiment, the Append Log Semaphore may have an associated queue of processes waiting to write to the transaction log. For example, if a process attempts to perform a transaction log write operation on an Append Log Semaphore which has the value zero, the process is added to the Append Log Semaphore's queue. When another process increments the Append Log Semaphore by performing a transaction log write operation, and there are other processes on the queue, one of the processes is removed from the queue and resumes its transaction log write task.

1.3 Physical Locks

A Physical lock is a mechanism used to maintain cache coherency. In an embodiment, cache coherency is maintained by a Buffer Coherency Manager (BCM) module. Access to pages in the cache is synchronized by acquiring physical locks at the node level. Anytime a transaction log page is requested either for read or for write, the task needs to take an appropriate physical lock (either a shared physical lock or an exclusive physical lock) on the page before the task can begin its operations on the requested transaction log page. In an embodiment, a physical lock is a node level locking mechanism.

In accordance with an embodiment, at the node level, a cluster node who wants to access the page has to first acquire a shared or exclusive physical lock on the transaction log page (based on its requirement). When the request for physical lock is made, it goes to Cluster Lock Manager (CLM) module, which in turn determines which node is the current owner of the physical lock on this log page. After the CLM identifies the current owner of physical lock on this page, it sends a blocking asynchronous trap (BAST) request to the owner node. Once the owner node is done with its operations on this page, it transfers the page to the requesting node, flushes the requested page to disk (if it is dirty), checks if the lock needs to be downgraded, and checks for a conflicting lock request such as a shared-exclusive (SH-EX) or exclusive-exclusive (EX-EX) conflict.

If the CLM can not determine which node holds the physical lock on a requested log page, the CLM assumes that this is the first physical lock request on this page and the CLM immediately grants a physical lock to the requesting node. At this time, the CLM indicates to the requesting node that the last log page can be read from disk.

1.4 Avoiding Physical Locks on the Transaction Log Pages

According to an embodiment of the present invention, many locking steps and methods for synchronizing log appenders are not needed because of use of the last log object lock (LLOL) and an Append Log Semaphore. Taking a physical lock on a page is an expensive, resource-intensive operation which involves messaging between the requester node, the cluster lock manager, and the owner node. Physical locks are retained by the node who requested it until a conflicting lock request arises. Maintaining physical locks is also resource-intensive as it involves overhead and memory consumption. Physical lock maintenance also consumes search time to determine which node is the current lock owner and what kind of lock the owner has. Accordingly, avoiding taking physical locks where-ever possible provides a gain in overall system performance.

1.5 Avoiding Physical Lock Acquisition on New Transaction Log Pages

The last log page (LLP) is a database object which is needed at one time or another by database tasks executing data manipulation language (DML) operations such as inserts, deletes, and updates. In order to maintain the ACID properties of transactions, a transaction log record is appended/written to the transaction log for each DML operation. Access to the LLP is very frequent and multiple access requests can arise simultaneously.

In a typical Online transaction processing (OLTP) application, DML operations need to append to transaction logs frequently. According to an embodiment of the invention, log scanners do not append to the transaction log. In an embodiment, log scanners and other database operations such as dump transaction commands, DBCC LOG transactions, and database triggers scan the transaction log in read-only mode, but do not append to the log. In an embodiment, log scanners such as deferred update transactions update intermediate log pages, but do not write new transaction log pages.

Once the last log object lock (LLOL) on a node has been acquired, there is no need to acquire any physical locks on the new allocated log pages as no other node will request the newly allocated log page before acquiring the LLOL. According to an embodiment, LLOL serializes access to newly allocated transaction log pages. In another embodiment, physical locks must still be taken for transaction log pages to avoid deadlocks with log scanners (i.e., tasks scanning previously allocated pages in the transaction log).

An embodiment of the present invention takes advantage of the above characteristics of transaction log and implements a locking scheme that avoids physical lock acquisition for newly allocated transaction log pages, including the last transaction log page.

Figure 1:
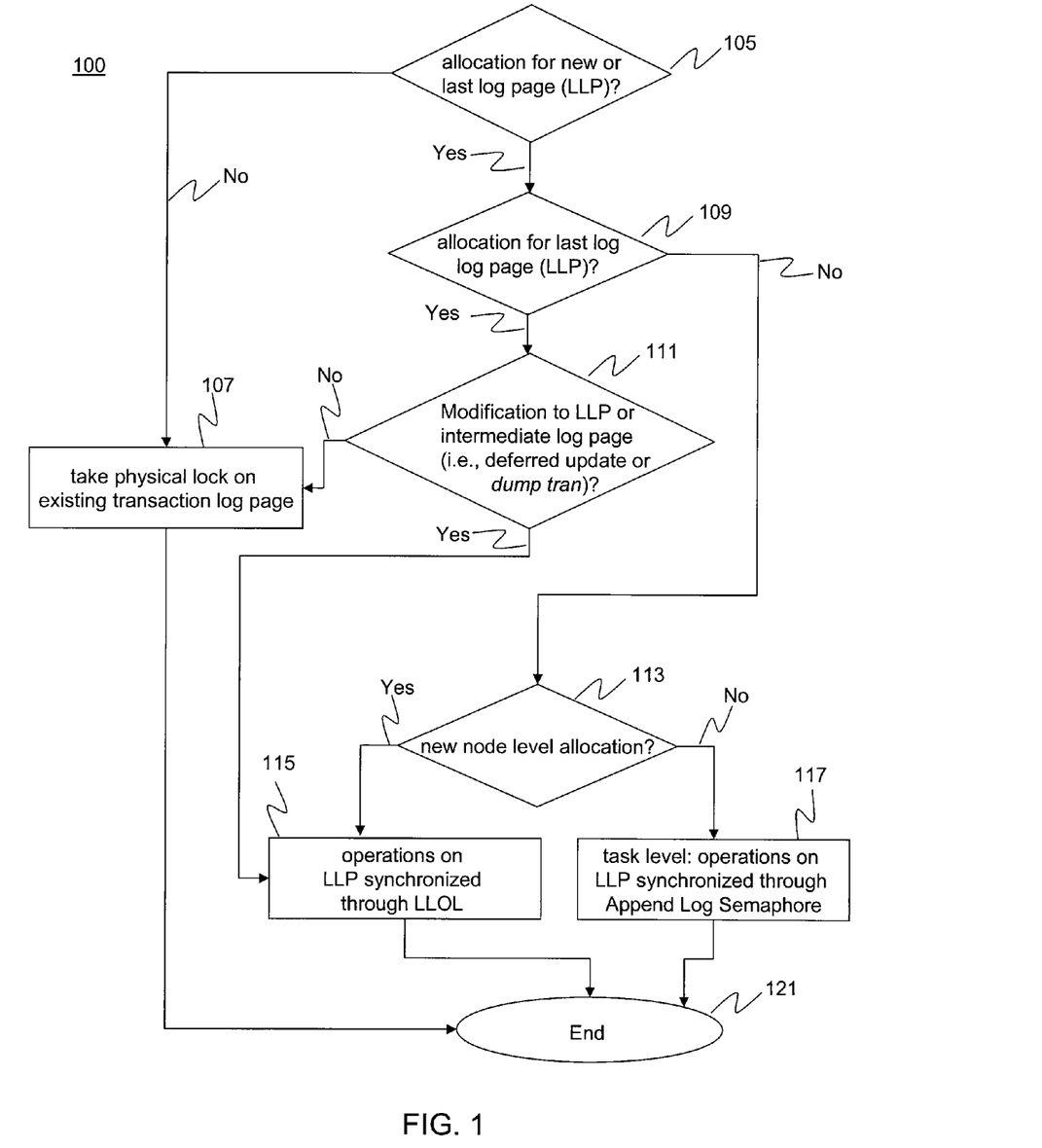
FIG. 1 is a flowchart illustrating steps by which physical lock acquisition on the new and last log page allocations is avoided, in accordance with an embodiment of the present invention.

FIG. 1 is a flowchart 100 illustrating steps by which locks on new and last transaction log pages are acquired, in accordance with an embodiment of the present invention.

More particularly, flowchart 100 illustrates the steps by which the locking method for new transaction log pages, including the last transaction log page, is performed, according to an embodiment of the present invention. Note that the steps in the flowchart do not necessarily have to occur in the order shown.

The method begins at step 105 where an evaluation is made regarding whether a log page request has been made for a newly-allocated transaction log page (including the last log page). If it is determined that an existing log page has been requested, control is passed to step 107. If it is determined that the request is for a new allocation of a log page (including the last log page), then control is passed to step 109.

Step 107 is further described below.

In step 109, an evaluation is made regarding whether a last log page (LLP) allocation is being made. If it is determined that a LLP allocation is being made, control is passed to step 111. If it is determined that a log page allocation is not being made for a log scanner, control is passed to step 113.

In step 111, an evaluation is made regarding whether a modification to the last log page (LLP) or an intermediate portion of the transaction log is being made. If it is determined that the transaction log is not being modified at the LLP or in an intermediate page of the log, control is passed to step 107. If it is determined that the transaction log is being modified at the LLP or to an intermediate page of the log, control is passed to step 115.

In step 107, physical locks are taken on existing transaction log pages. In accordance with an embodiment of the present invention, log scanners will still take physical locks on the log pages when the log modification occurs at the LLP or to an intermediate page of the log. In step 107, read-only log scanners and database operations such as database consistency check (dbcc) log commands and database triggers will take physical locks on existing transaction log pages. In step 107, log scanners and database operations that modify transaction logs in between log pages, such as deferred updates, dump transaction, and checkpoint operations may also take physical locks on existing transaction log pages. According to an embodiment, in step 107, read/write operations on log pages besides the LLP and newly-allocated log pages are synchronized by taking physical locks. After physical locks for existing log pages are acquired by log scanners in step 107, the method ends in step 121.

In step 113, an evaluation is made regarding whether the new log page allocation is occurring at the node or task level. If it is determined that the new log page allocation is occurring at the node level, then control is passed to step 115. If it is determined that the log page allocation is occurring at the task level, control is passed to step 117.

In step 115, operations on said LLP are synchronized through the Last Log Object Lock (LLOL) for operations at the node level, in accordance with an embodiment of the present invention, and the process ends in step 121.

In step 117, operations on the LLP at the task level are synchronized through the Append Log Semaphore, according to an embodiment of the invention, and the process ends in step 121.

2.0 Special Cases

In certain cases, log scanners that modify intermediate pages of the transaction log (e.g., deferred updates and dump tran operations) will additionally take the last log object lock (LLOL) when modifying particularly the last transaction log page. However, in accordance with an embodiment of the invention, log scanners will not append to the transaction log.

The following paragraphs detail how these cases are addressed, in accordance with embodiments of the present invention.

2.1 No Physical Locks on New Log Allocations

According to an embodiment of the present invention, the locking method for the last transaction log page does not take physical locks on the freshly allocated log pages. In an embodiment, operations on the Last transaction log Page (LLP) are synchronized through the Last Log Object Lock (LLOL) at the node level and via use of the Append Log Semaphore at the task level. Section 2.2 gives a specific example of and details how tasks that append to transaction logs (i.e., log appenders) can use LLOL and the Append Log Semaphore to avoid taking physical locks for newly-allocated transaction log pages, according to an embodiment of the invention.

2.2 Synchronizing Log Appenders Through the Last Log Object Lock

According to an embodiment, when multiple nodes need to append to a transaction log, access to the last log page (LLP) is synchronized by steps of a method. A timeline for synchronizing access to the LLP is described in Table 1 in accordance with an embodiment of the invention.

TABLE 1

Timeline for Synchronizing the Last Log Page Between Appending Nodes

| Step# | Log Appender Node 1 (Owner of the LLOL) | Log Appender Node 2 (Requester of the LLOL) |
|---|---|---|
| 1. |  | Requests LLOL |
| 2. | LLOL request is handled by BCM thread of this node. |  |
| 3. | Takes Append log semaphore (to synchronize with the local tasks that are already waiting to write their log records). |  |
| 4. | Flushes the dirty log pages to the disk. |  |
| 5. | Downgrades the Last transaction log Object Lock. |  |
| 6. | LLOL gets transferred to Node 2 |  |
| 7. |  | Reads the LLP from disk and proceeds with writing its log records |

Figure 2:
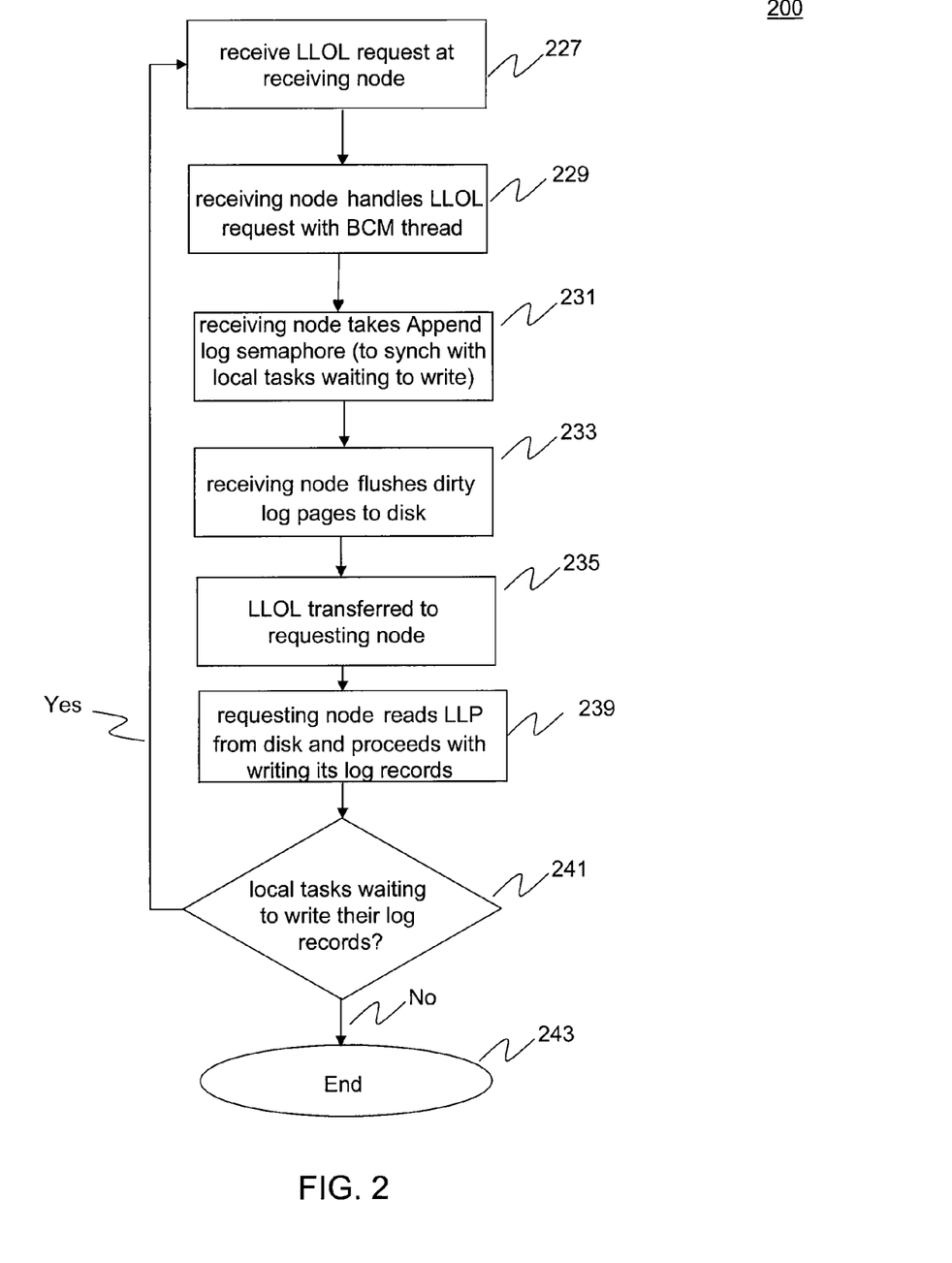
FIG. 2 is a flowchart illustrating steps by which the last log page modifiers are synchronized, in accordance with an embodiment of the present invention.

The steps synchronizing access to the LLP include, but are not limited to, those listed and described in FIG. 2. FIG. 2 is a flowchart 200 illustrating steps by which locks on new and last transaction log pages are acquired, in accordance with an embodiment of the present invention.

More particularly, flowchart 200 illustrates the steps by which synchronization of access to the LLP amongst multiple nodes is achieved, according to an embodiment of the present invention. Note that the steps in the flowchart do not necessarily have to occur in the order shown.

The method begins at step 227 where the LLOL is requested by a node that needs to append to the transaction log.

In step 229, the LLOL request from step 227 is handled by the Buffer Coherency Manager (BCM) thread of a receiving node. According to an embodiment, the receiving node in step 229 is the current owner of the LLOL.

In step 231, according to an embodiment, the receiving node takes the Append Log Semaphore in order to synchronize access to the LLP with other local tasks waiting to write to the transaction log.

In step 233, the receiving node examines the log and flushes any dirty transaction log pages to disk. In accordance with an embodiment of the present invention, the current owner of the LLOL flushes any dirty log pages in the transaction log chain before transferring the LLOL to node that requested the LLOL in step 227.

In step 235, the LLOL is transferred to the node that requested it in step 227 and the requesting node becomes the owner of the LLOL. After the LLOL is transferred to the requesting node, control is passed to step 239.

In step 239, the requesting node reads the LLP from disk and writes its log records to the transaction log. After the requesting node has written its log records to the log, control is passed to step 241.

In step 241, an evaluation is made regarding whether there are local tasks waiting to write their log records to the transaction log. If it is determined in step 241 that local tasks are waiting to write their log records to the transaction log, control is returned to step 227 and steps 227-241 are repeated. This process is repeated until there are no more local tasks waiting to write their log records to the transaction log.

If it is determined that there are no more local tasks waiting to write their log records to the transaction log, control is passed to step 243, where the process ends.

3.0 Avoiding Transaction Log Corruption

There are scenarios with a partially filled last transaction log page that need special attention to avoid the possibility of transaction log page corruption. The following paragraphs detail how embodiments of the present invention address these scenarios to avoid transaction log page corruption.

3.1 Synchronizing Deferred Update and Log Appenders

Figure 3:
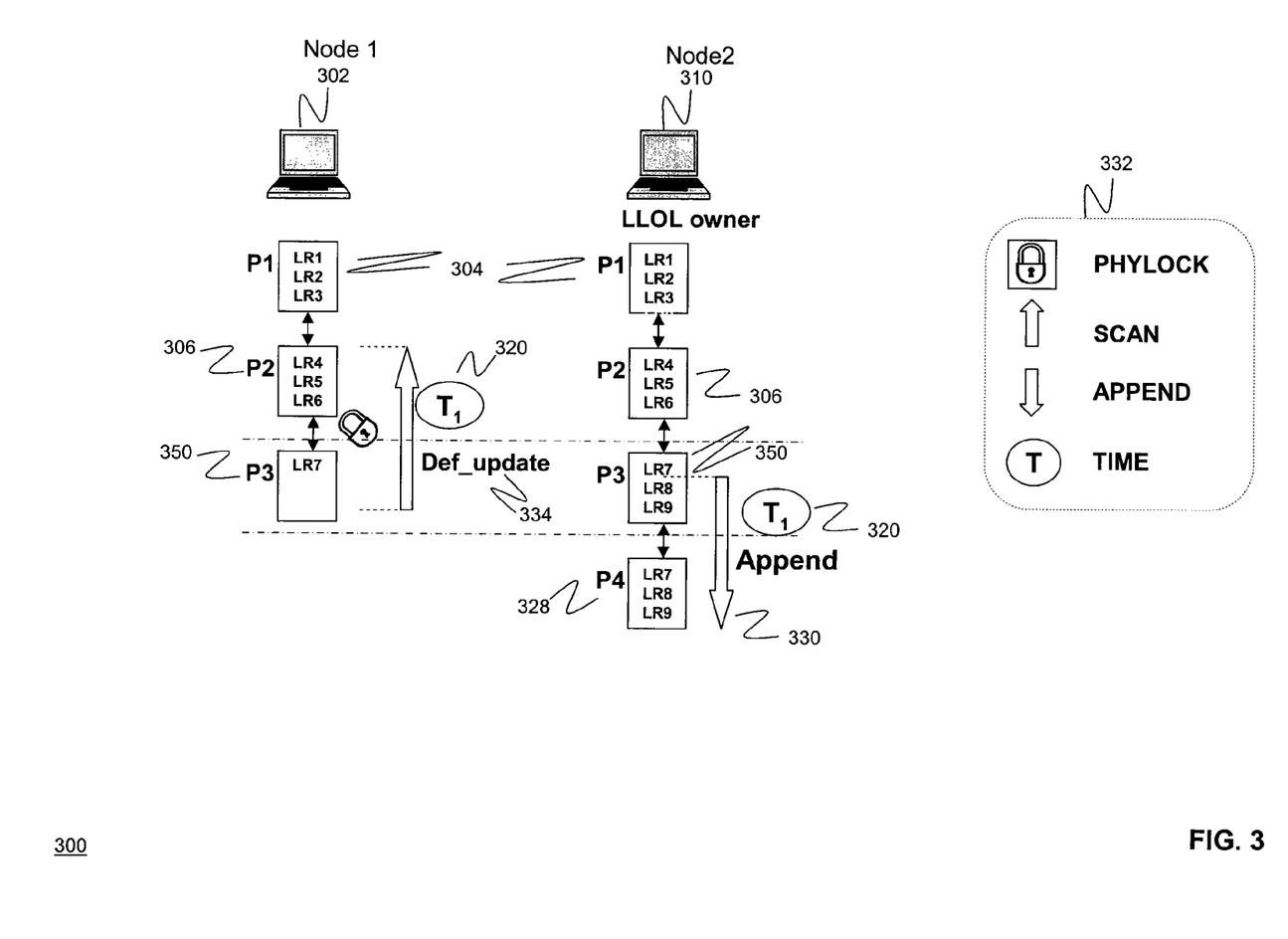
FIG. 3 illustrates depicts a scenario wherein a transaction log page can be corrupted when a node performs a log scan at the same time a second node is appending to a transaction log, as is currently known in the art.

FIG. 3 depicts a scenario 300 in which a first node, Node 302, a log scanner, was initially performing a log scan and at the same time, T1 320, a second node 310 was appending to the transaction log. FIG. 3 contains a key 332 illustrating four different items used to depict transaction log operations in FIGS. 3-7. Key 332 includes a physical lock, log scan operation, log append operation, and a time indicator.

Transaction log page P1 304 is not being updated by nodes 302 or 310 at time T1 320. At time T1 320, node 302 performs a log scan via a deferred update 334 and node 310 initiates an append operation 330. Append operation 330 initiated by node 310 attempts to write log records LR8 and LR9 to partially-filed transaction log page P3 350, but must instead write log records LR7-LR9 to new page P4 328 because at time T1 320, node 302 holds a physical lock on transaction log page P3 350 containing log record LR7.

There is no potential for transaction log corruption or deadlocking until deferred update 334, which initiates a log scanner operation on Node 302, attempts to modify transaction log records at a subsequent time beginning from the last transaction log page P4 328. As is currently known in the art, corruption can occur in transaction log page in P3 350 when nodes 302 and 310 write to P3 350 simultaneously. The solution to this log page corruption problem is discussed below with reference to FIGS. 4-7.

Figure 4:
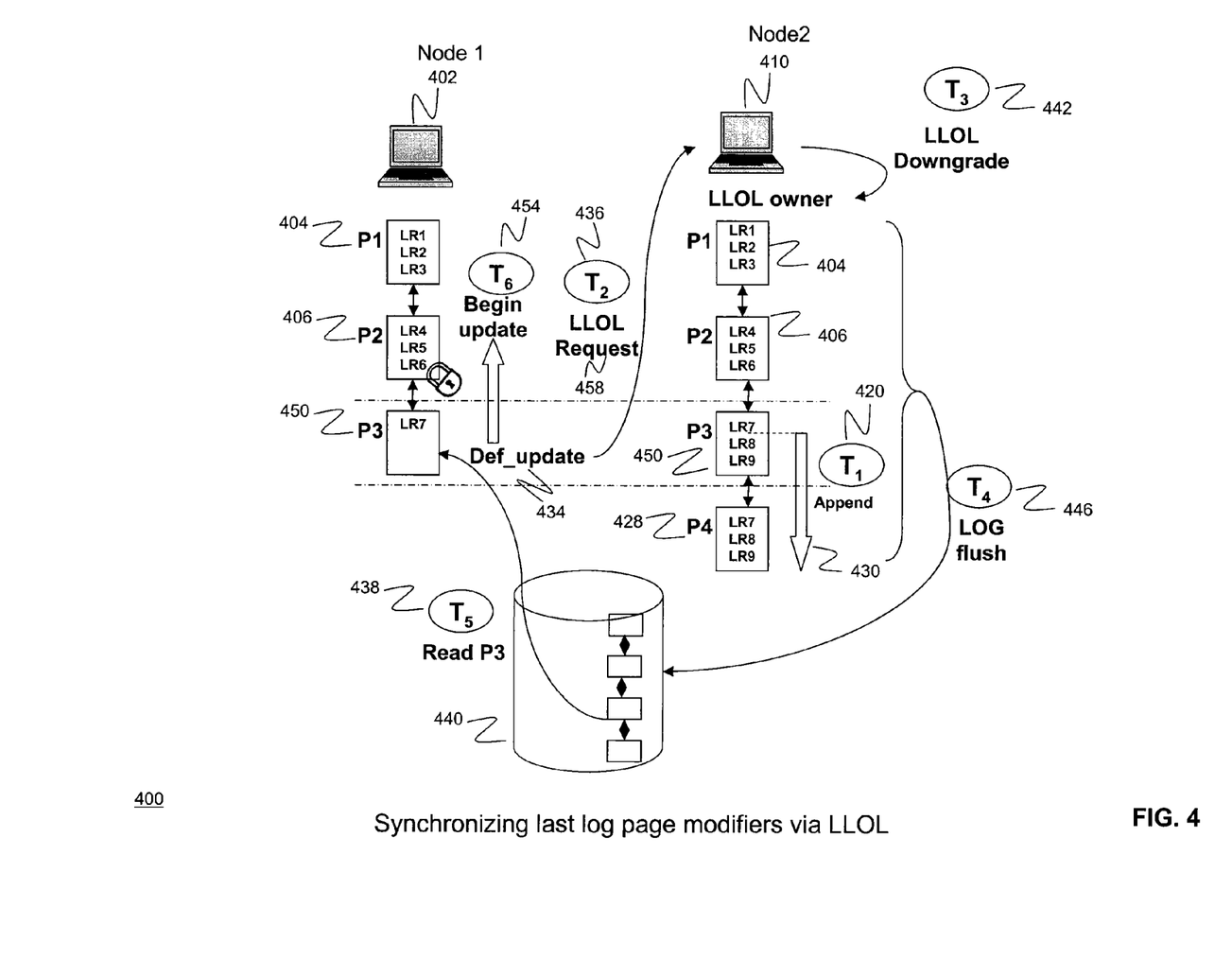
FIG. 4 depicts synchronizing last transaction log page modifiers via last log object lock (LLOL), in accordance with an embodiment of the present invention.

FIG. 4 depicts how the problem depicted in FIG. 3 is solved by synchronization 400 of last log page (LLP) modifiers. More particularly, FIG. 4 depicts the sequence of steps involved in the solution as a time line from time T1 420. According to an embodiment of the present invention, LLP modifiers are synchronized via use of the last log object lock (LLOL). In order to resolve write conflicts between nodes 402 and 410 on the last transaction log page P3 450, deferred update 434 takes the LLOL.

At time T1 420, node 410 initiates transaction log append 430. As a result of log append 430, node 410 writes new log records LR8 and LR9 into partially filled log page P3 450, allocates new log page P4, and then continues writing new log records. At this point node 410 is the current owner of last log object lock (LLOL).

At time T2 436, node 402 requests the last log object lock (LLOL) by issuing LLOL request 458, and node 410 handles the LLOL blocking asynchronous trap (BAST) request.

At time T3 442, node 410 downgrades the LLOL, thus making it available to node 402. Then, at time T4 446, node 410 flushes any dirty log pages to disk 440.

At time T5 438, after node 402 has the LLOL, it reads the latest image of page P3 450 from disk 440.

At time T6 454, deferred update 434 executes on node 402, and the update begins to modify log page P3 450. After reading page P3 450 from disk 440, node 402 then performs the following steps (depicted as pseudo-code):

```
if (P3 450 is not the actual last transaction log page)
{
    Release the LLOL immediately and continue with
    deferred update operation 434.
}
else
{
    Keep the LLOL until the deferred update processing
    434 of last log pageP3 450 is done.
}
```

Once the last log page P3 450 is updated successfully, the Append Log Semaphore is immediately released by node 402 so that any pending requests for LLOL can be subsequently served.

According to one embodiment of the present invention, the cmcc_lastlogrefresh( ) function performs the activities depicted in FIG. 4 on last log page. For example, the cmcc_lastlogrefresh( ) function is called when a log scanner operation such as dump transaction log or deferred update 434 attaches to last log page P3 450 in order to modify it, but log scanner operations will not write new transaction log records or append to the transaction log.

In an embodiment, newly allocated transaction log page P4 428 is marked as private to node 410 by setting the PRIVATE_TO_NODE status indicator flag using the MARK_MASS_PRIVATETONODE (mass_ptr) Application Programming Interface (API). According to an embodiment, a MASS is a group of buffers which are controlled together in the cache. For example, a MASS may be an attached unit used to control a group of buffers. Once a MASS is marked as being private to node 410, the BCM does not take a physical lock on newly allocated transaction log page P4 428. In accordance with an embodiment, a MASS with PRIVATE_TO_NODE status is visible to local tasks on node 410 and is not visible to the cluster lock manager or any other node, such as node 402.

As long as a transaction log page such as P3 450 remains the last transaction log page, the PRIVATE_TO_NODE status indicator flag is not cleared. The moment a new last transaction log page is allocated, such as P4 428, the PRIVATE_TO_NODE status indicator flag is cleared for the previous last transaction log page. In an embodiment, the PRIVATE_TO_NODE status flag is cleared done by a call to the bufdbtlastlog( ) function.

If the private log cache (PLC) flush (log write) is requested on a existing last transaction log page, the access to it is granted through a new simplified function cmcc_getlastlogbp_nolock( ) which returns the last transaction log page buffer without acquiring the physical lock.

3.2 Synchronizing Log Modifiers and Read-Only Scanners

Figure 5:
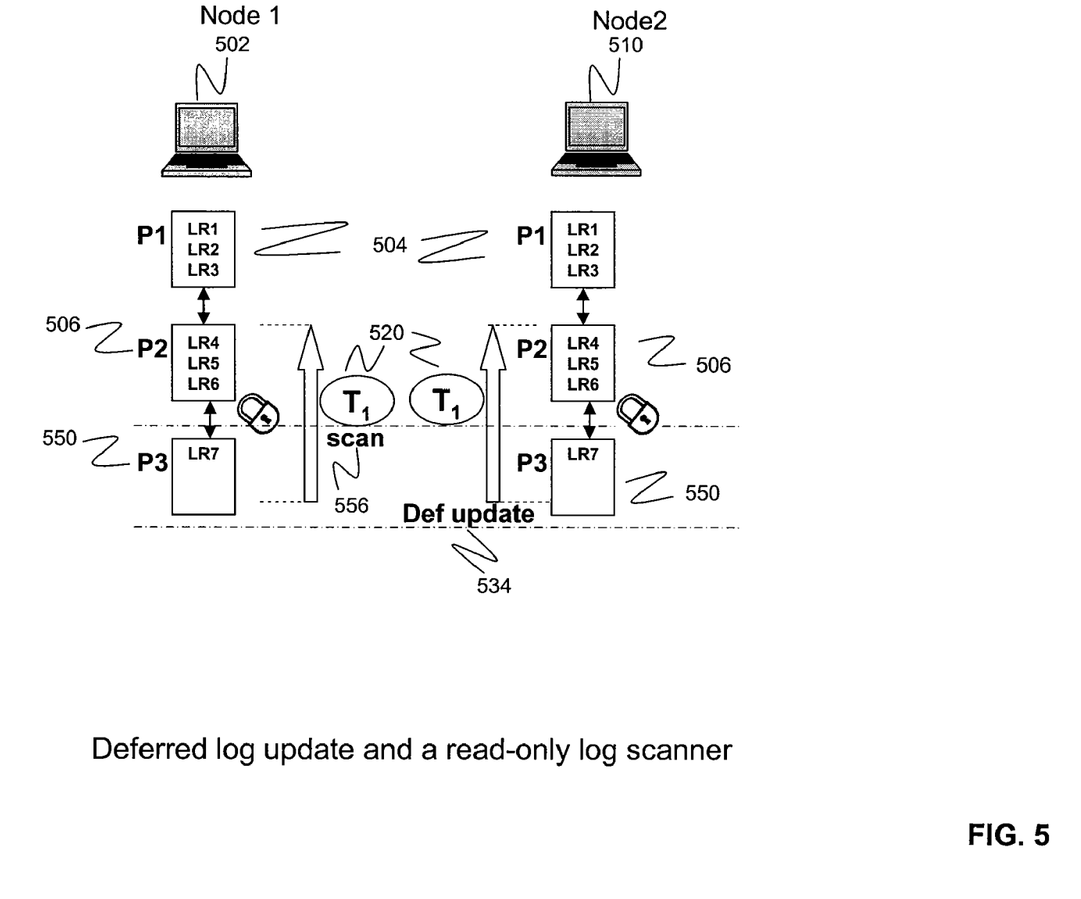
FIG. 5 illustrates a deferred transaction log update and a read-only transaction log scanner, in accordance with an embodiment of the present invention.

FIG. 5 depicts how a simultaneous deferred update and read-only log scanner operation are processed, according to an embodiment of the present invention. More particularly, FIG. 5 depicts a scenario 500 in which a first node, node 502, a log scanner, is performing log scan 556 at time T1 520, and at the same time, node 510 is modifying the transaction log by appending to the log.

In accordance with an embodiment of the present invention, all log scanners and log modifiers such as dump tran and deferred update operation 534, in addition to read-only log scanners (e.g. DBCC log); still take physical locks when they access existing transaction log pages, such as P3 550. For example, transaction log access is still synchronized through physical locks as depicted in FIG. 5. Node 502 that needs to scan the log via scan operation 556 at time T1 520 in read-only mode will take a shared physical lock on log page P3 550 and any modifiers of the log such as node 510 will take and exclusive physical lock.

At time T1 520, node 502 performs log scan 556 while node 510 initiates deferred update operation 534. Node 502 is the owner of the LLOL at this time and node 502 has allocated three transaction log pages: P1 504, P2 506, and P3 550; with P3 550 being a partially filled page.

Log scan 556 is not prevented from taking a physical lock on log page P3 550 as scanners sometimes takes a physical lock on the last log page. Scenario 500 depicted in FIG. 5 may arise which can result in transaction log page corruption.

Also at time T1 520, node 510 gets the LLOL and node 502 flushes its log pages to disk. Then node 510 reads the last log page P3 550 from disk. Transfer of the LLOL does not happen at this time because neither node has a physical lock on any of the log pages.

Node 510 continues appending to the log as a result of deferred update operation 534. Deferred update 534 then fills page P3 550, and allocates a new log page (such as P4 428 depicted in FIG. 4).

Node 502 then scans the log pages and takes a physical lock on all of the log pages it scans, including page P3 550.

At the same time, node 510 begins a scan and requests a physical lock on page P3 550. At this point a problem can arise as a part of node 510's physical lock request, such as the old image of page P3 550, should not be transferred from node 502 to node 510. This can result in page corruption, and the solution to this potential problem is depicted in FIG. 6 and described below.

3.3 Taking a Physical Lock on a Partially Filled Log Page

Figure 6:
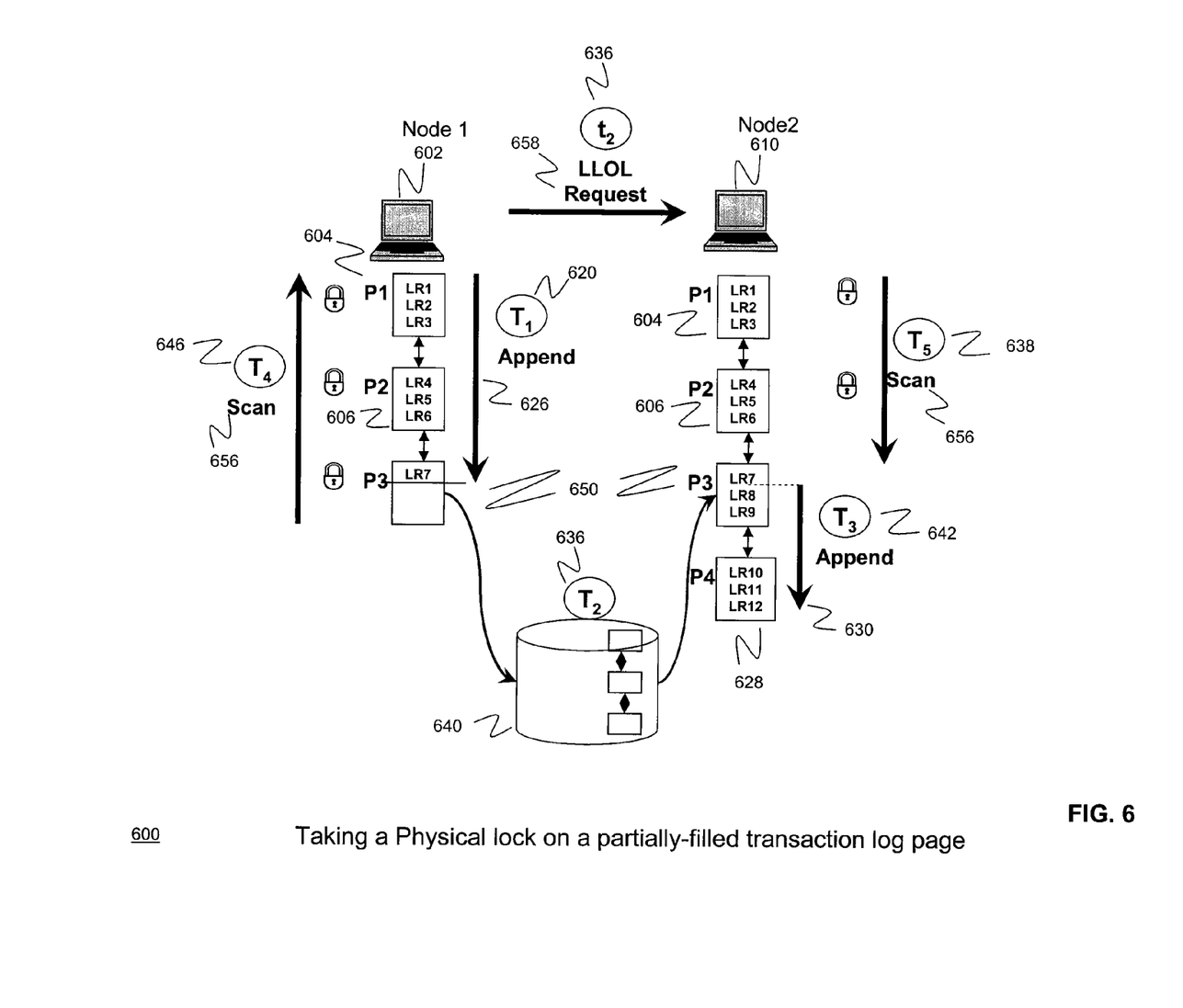
FIG. 6 depicts taking a physical lock on a partially-filled transaction log page, in accordance with an embodiment of the present invention.

As log scanners are not prevented from taking physical locks on log pages (scanners sometimes take physical locks on the last log page but do not append to the log), the following situation depicted in FIG. 6 may arise which can result in transaction log page corruption. A solution to the log page corruption involving partially filled log pages is described below with reference to FIG. 6.

FIG. 6 illustrates a method 600 for taking a physical lock on a partially filled page, in accordance with an embodiment of the invention.

At time T1 620, node 602 initiates append operation 626. Append operation 626 attempts to write to partially filled log page P3 650 as pages P1 604 and P2 606 are full.

At time T2 636, node 602 sends a LLOL request 658 to node 610. At this time node 602 identifies that a page transfer has been requested on log page P3 650 whose next page pointer is NULL, and it immediately cancels the transfer request. At this point, node 602 sets a flag or variable accessible to node 610, wherein the flag or variable indicates that the node 602 could not transfer the requested log page. In an embodiment of the invention, node 602 sends a TXCANCEL cookie to requester node 610, which indicates that node 602 cannot transfer the page.

Also at time T2, after node 610 receives a flag indicating that page P3 650 cannot be transferred, node 610 may attempt to read P3 650 from disk 640, but the read operation is prevented when the page is dirty. In an embodiment, the flag received by node 610 is the TXCANCEL cookie sent by node 602.

At time T3 642, node 610 requests a physical lock on page P3 650, and the Cluster Lock Manager (CLM) redirects the request to node 602.

After a physical lock is requested for page P3 650, nodes 602 and 610 then perform the following steps (depicted as pseudo-code):

Sender Node 602:

```
/* Sender node 602 tests the following condition just before transferring
the page/flag/cookie to the requester node. */
if (If the next page pointer of current page == NULL && page
belongs to LOG)
{
    Cancel the page transfer by setting a flag or TXCANCEL
    cookie for node 610.
}
```

Receiver Node 610:

```
/* After identifying the flag or TXCANCEL cookie, receiver node
will attempt to read the page from disk. In such case, page
corruption can be avoided by preventing buffer read operation
under the following condition: */
if ((transaction log page is dirty) OR (it is the last log page))
{
    Do not read it from disk 640.
}
```

At time T4 646, node 602 initiates log scan 656 of log pages P3 650, P2 606, and P1 604. At time T5 638, log scan 656 is initiated by node 610. Log scan operation 656 scans log pages P1 604 and P2 606.

The solution to the problem 500 depicted in FIG. 5 lies in the lock manager design. According to an embodiment, when a node such as 602 takes physical lock for the first time on a transaction log page such as P3 650, the page time stamp (PTS) value of the page being locked is set in the lock value block. In an embodiment of the present invention, this operation is performed by the brfinish( ) routine. When node 610 subsequently requests a physical lock on the same page P3 650, the lock manager compares its PTS timestamp value with the timestamp set within the lock value block and does not initiate a transfer when the PTS timestamp value of page P3 650 on requester node 602 is newer than the PTS within the lock value block.

In accordance with an embodiment, if a call to the cmcc_bufgetphysicallock( ) function does not go through bufread( ) and hence brfinish( ), the page transfer can still happen and can still result in log page corruption. This page corruption scenario can happen when the last log page P3 650 is already cached in node 602 and scan operation 656 begins on node 602. Scan operation 656 acquires a physical lock without reading the page P3 650 from disk. According to an embodiment, scan operation 656 does not write new transaction log records or append to the transaction log.

3.4 Broken Log Sequence Problem and Solution

This subsection describes a case in which presence of a partially-filled transaction log page in cache can result in a broken log sequence, which can in turn result in wrong log page errors. A solution to the broken log sequence problem is described below with reference to FIG. 7.

Figure 7:
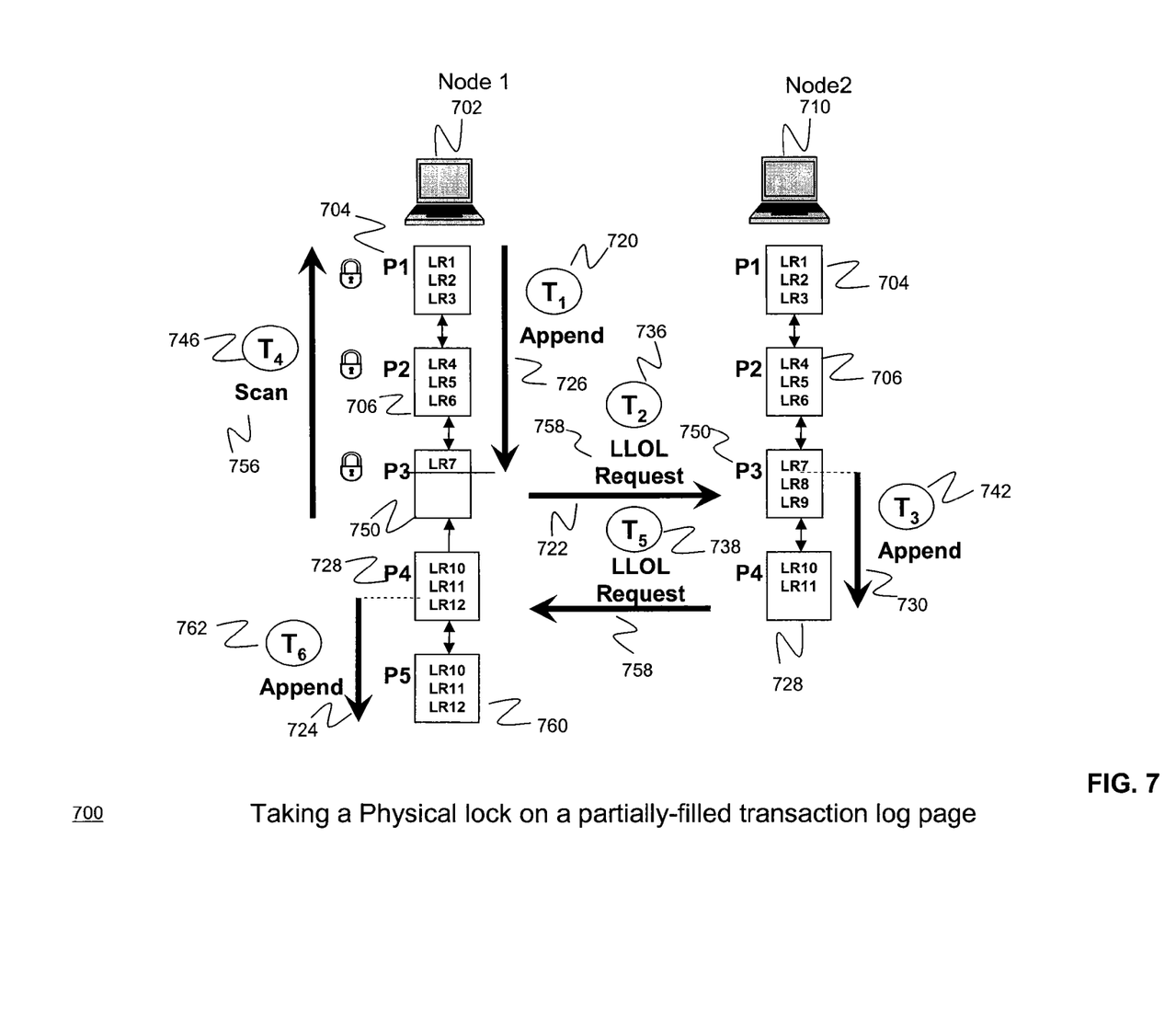
FIG. 7 illustrates a method for taking a Physical lock on a partially-filled transaction log page, in accordance with an embodiment of the present invention.

At time T1 720, node 702 initiates append operation 726. At this time, node 702 is the owner of the LLOL and writes log pages P1 704, P2 706, and P3 750 (P3 750 is partially filled). Append operation 726 writes to partially filled log page P3 750 as pages P1 704 and P2 706 are full.

At time T2 736, node 702 sends a LLOL request 722 to node 710. At this time node 710 gets the LLOL.

At time T3 742 append operation 730 on node 710 fills page P3 750 and allocates a new transaction log page, P4 728.

At time T4 746, node 702 scans log pages P1 704, P2 706, and P3 750 and acquires physical locks on them. At time T4 746, node 702 does not write new transaction log records or append to the transaction log when scanning log pages P1 704, P2 706, and P3 750.

At time T5 738, node 702 requests the LLOL from node 710 again via LLOL request 758.

At time T6 762, node 702 initiates append operation 724. Append operation 724 fills log page P4 728 and allocates a new log page, P5 760.

A potential problem arises at this point if node 702 begins a forward scan (such as a dump tran operation identifying the range of log pages that need to be de-allocated). This problem exists when a scan on node 702 starts at page P1 704 and it can not go beyond page P3 750 as the link between P3 750 and P4 760 does not exist. The presence of a partially filled log page, such as P3 750 within a cache can result in a broken chain and can cause a broken log sequence error. Solutions to the broken log sequence error are described below, with continued reference to FIGS. 6 and 7.

When a dump tran operation identifies a broken log sequence, the log sequence is not necessarily also broken on disk 640. It is possible that a broken log sequence exists only in the cache, and that disk 640 still has a valid log sequence. To solve this broken log sequence problem, when a forward log scanner, such as scan 756, detects broken log sequence, scan 756 attempts to re-read page P3 750 from disk 640. In the example of FIGS. 6 and 7, page P3 750 still points to P4 728 on disk 640, and the log sequence is not broken on disk 640.

According to an embodiment, to prevent broken log situations from arising, when a node such as 702 does not own the LLOL, the method avoids keeping the last log page in cache longer than it is needed by node 710. In accordance with an embodiment, when no node is working on the last log page, it is removed from the cache.

In accordance with an embodiment of the present invention, a bufnewpage( ) function is called when a new transaction log page, such as P5 760, is allocated. The bufnewpage( ) call immediately marks a newly allocated transaction log page, such as P5 760 as private to a node (node 702 in the example embodiment of FIG. 7).

Figure 8:
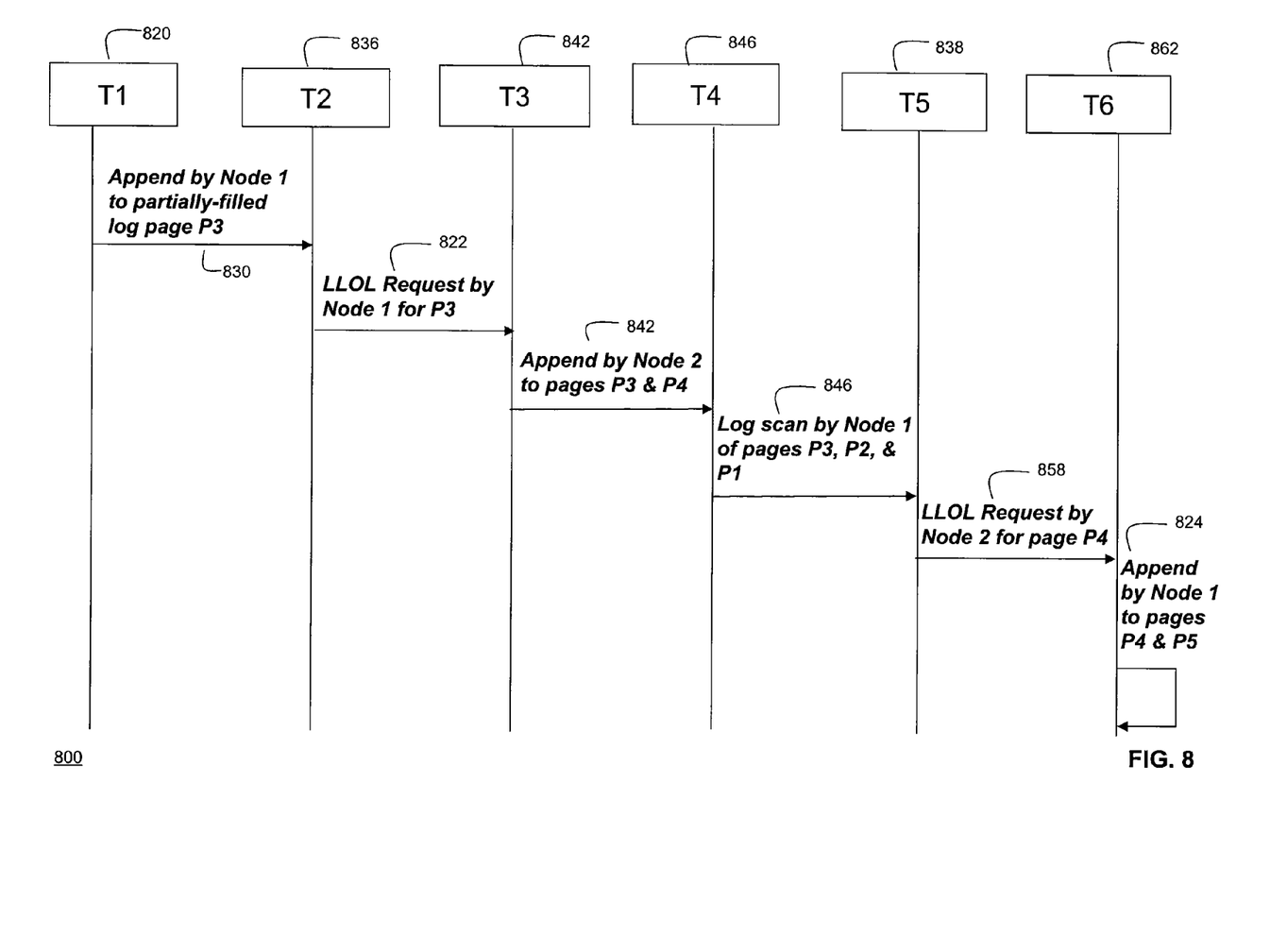
FIG. 8 provides a Message Sequence Chart (MSC) of taking a physical lock on a partially-filled transaction log page, according to an embodiment of the invention.

FIG. 8 provides a Message Sequence Chart (MSC) of taking a physical lock on a partially-filled transaction log page, according to an embodiment of the invention. In particular, FIG. 8 depicts an embodiment of the invention that comprises the steps of the embodiment depicted in FIG. 7. FIG. 8 is described with continued reference to the embodiments illustrated in FIG. 7. However, FIG. 8 is not limited to that embodiment.

At time T1 820, Node 1 initiates transaction log append operation 830. Append operation 830 appends to partially-filled log page P3 At this time, node 1 is the owner of the LLOL and writes to partially filled log page P3 750 as pages P1 704 and P2 706 are full.

At time T2 836, node 1 sends a LLOL request for P3 to a receiving node, node 2 in the example of FIG. 8. At this time node 2 has the LLOL.

At time T3 842 append operation on node 2 fills page P3 750 and allocates a new transaction log page, P4 728.

At time T4 846, node 1 scans log pages P1 704, P2 706, and P3 750 and acquires physical locks on them. At time T4 846, node 1 does not allocate new log pages when scanning log pages P1 704, P2 706, and P3 750.

At time T5 838, node 1 requests the LLOL from node 2 again via an LLOL request sent to node 2.

At time T6 862, node 1 initiates an append operation that fills log page P4 728. At this time new log page, P5 760, is allocated.

4. Example Computer System Implementation

Figure 9:
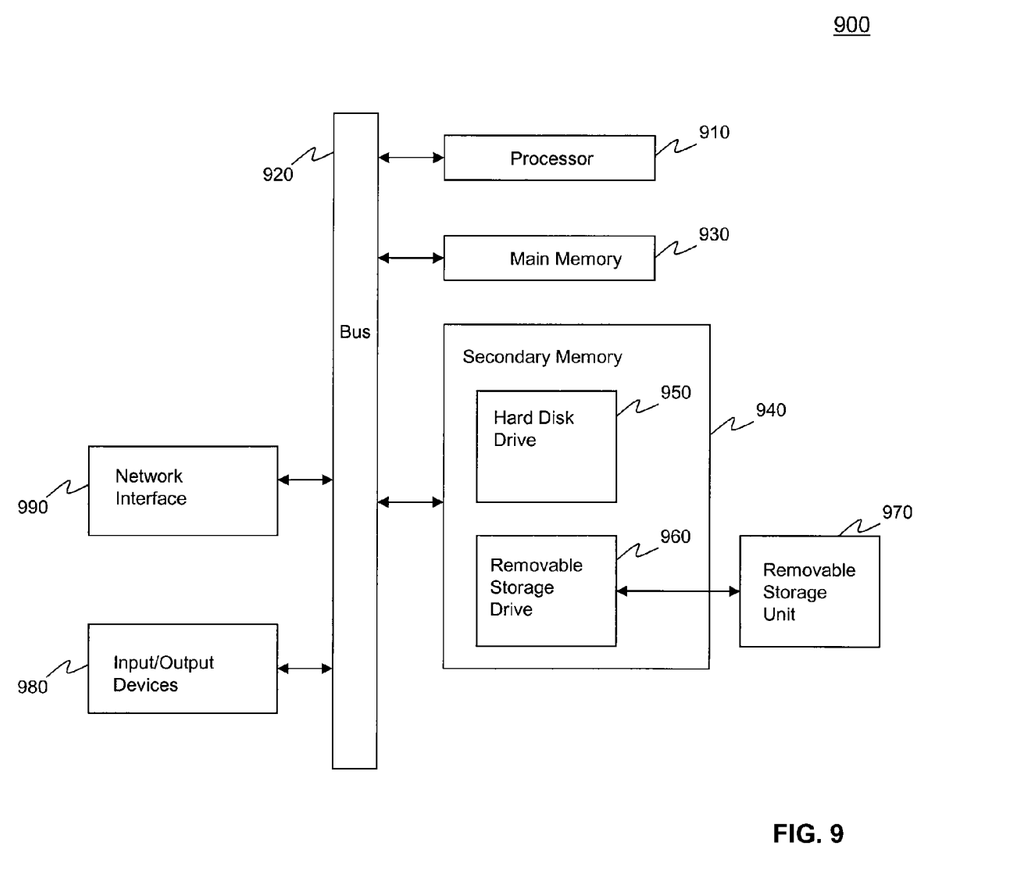
FIG. 9 depicts an example computer system in which the present invention may be implemented.

Various aspects of the present invention can be implemented by software, firmware, hardware, or a combination thereof. FIG. 9 illustrates an example computer system 900 in which the present invention, or portions thereof, can be implemented as computer-readable code. For example, the method illustrated by flowcharts 100 and 200 of FIGS. 1 and 2 can be implemented in system 900. Various embodiments of the invention are described in terms of this example computer system 900. After reading this description, it will become apparent to a person skilled in the relevant art how to implement the invention using other computer systems and/or computer architectures.

Computer system 900 includes one or more processors, such as processor 904. Processor 904 can be a special purpose or a general purpose processor. Processor 904 is connected to a communication infrastructure 906 (for example, a bus or network).

Computer system 900 also includes a main memory 908, preferably random access memory (RAM), and may also include a secondary memory 910. Secondary memory 910 may include, for example, a hard disk drive 912, a removable storage drive 914, and/or a memory stick. Removable storage drive 914 may comprise a floppy disk drive, a magnetic tape drive, an optical disk drive, a flash memory, or the like. The removable storage drive 914 reads from and/or writes to a removable storage unit 918 in a well known manner. Removable storage unit 918 may comprise a floppy disk, magnetic tape, optical disk, etc. which is read by and written to by removable storage drive 914. As will be appreciated by persons skilled in the relevant art(s), removable storage unit 918 includes a computer usable storage medium having stored therein computer software and/or data.

In alternative implementations, secondary memory 910 may include other similar means for allowing computer programs or other instructions to be loaded into computer system 900. Such means may include, for example, a removable storage unit 922 and an interface 920. Examples of such means may include a program cartridge and cartridge interface (such as that found in video game devices), a removable memory chip (such as an EPROM, or PROM) and associated socket, and other removable storage units 922 and interfaces 920 which allow software and data to be transferred from the removable storage unit 922 to computer system 900.

Computer system 900 may also include a communications interface 924. Communications interface 924 allows software and data to be transferred between computer system 900 and external devices. Communications interface 924 may include a modem, a network interface (such as an Ethernet card), a communications port, a PCMCIA slot and card, or the like. Software and data transferred via communications interface 924 are in the form of signals which may be electronic, electromagnetic, optical, or other signals capable of being received by communications interface 924. These signals are provided to communications interface 924 via a communications path 926. Communications path 926 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 918, removable storage unit 922, and a hard disk installed in hard disk drive 912. Signals carried over communications path 926 can also embody the logic described herein. Computer program medium and computer usable medium can also refer to memories, such as main memory 908 and secondary memory 910, which can be memory semiconductors (e.g. DRAMs, etc.). These computer program products are means for providing software to computer system 900.

Computer programs (also called computer control logic) are stored in main memory 908 and/or secondary memory 910. Computer programs may also be received via communications interface 924. Such computer programs, when executed, enable computer system 900 to implement the present invention as discussed herein. In particular, the computer programs, when executed, enable processor 904 to implement the processes of the present invention, such as the steps in the methods illustrated by flowcharts 300 of FIG. 3 and 400 of FIG. 4 discussed above. Accordingly, such computer programs represent controllers of the computer system 900. Where the invention is implemented using software, the software may be stored in a computer program product and loaded into computer system 900 using removable storage drive 914, interface 920, hard drive 912, or communications interface 924.

The invention is also directed to computer program products comprising software stored on any computer useable medium. Such software, when executed in one or more data processing device, causes a data processing device(s) to operate as described herein. Embodiments of the invention employ any computer useable or readable medium, known now or in the future. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage device, etc.), and communication mediums (e.g., wired and wireless communications networks, local area networks, wide area networks, intranets, etc.).

5. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. It should be understood that the invention is not limited to these examples. The invention is applicable to any elements operating as described herein. Accordingly, the breadth and scope of the present invention should not be limited by any of the above-described exemplary embodiments, but should be defined only in accordance with the following claims and their equivalents.

What is claimed is:

1. A method for improving physical lock acquisition for transaction logs, the method comprising:
    (a) receiving, by a computing device, a request for a transaction log page;
    (b) determining whether said requested log page is newly-allocated;
    (c) determining whether a last log page (LLP) is being modified;
    (d) taking a physical lock on said requested log page if it is determined in step (b) that said requested log page is not newly-allocated and it is determined in step (c) that the LLP is not being modified; and
    (e) synchronizing LLP operations without a physical lock if it is determined in step (b) that said requested log page is newly-allocated or it is determined in step (c) that the LLP is being modified.

2. The method of claim 1, wherein step (c) further comprises:
    determining whether an intermediate page of a transaction log is being modified.

3. The method of claim 2, wherein step (e) further comprises:
    synchronizing operations on said LLP without a physical lock if it is determined in step (b) that said requested log page is newly-allocated, it is determined in step (b) that an intermediate page of the transaction log is being modified, or it is determined in step (c) that the LLP is being modified.

4. The method of claim 1, further comprising:
    (f) if it is determined in step (b) that said requested log page is newly-allocated, then determining whether the log page allocation is occurring at the node or task level.

5. The method of claim 4, further comprising:
    (g) synchronizing operations on said LLP through a Last Log Object Lock (LLOL) if it is determined in step (b) that said requested log page is newly-allocated, and it is determined in step (f) that the log page allocation is occurring at the node level.

6. The method of claim 5, further comprising:
    (h) synchronizing operations on said LLP through an Append Log Semaphore if it is determined in step (b) that said requested log page is newly-allocated, and it is determined in step (f) that the log page allocation is occurring at the task level.

7. The method of claim 6, wherein said Append Log Semaphore is at least one of a counting semaphore, a binary semaphore, a flag, a variable, and a mutex.

8. A computer program product comprising a computer usable medium having computer program logic recorded thereon for enabling a processor to improve physical lock acquisition for transaction logs, the computer program logic comprising:
    receiving means for enabling a processor to receive a request for a transaction log page;

determining means for enabling a processor to determine whether said requested log page is newly-allocated;

detecting means for enabling a processor to detect when a last log page (LLP) is being modified;

locking means for enabling a processor to take a physical lock on said requested log page if it is determined that said requested log page is not newly-allocated and the detecting means detects that the LLP is not being modified; and synchronizing means for enabling a processor to synchronize LLP operations without a physical lock if it is determined that said requested log page is newly-allocated or the detecting means detects that the LLP is being modified.

9. The computer program product of claim 8, wherein the detecting means further comprises:

detecting when an intermediate page of the transaction log is being modified.

10. The computer program product of claim 9, wherein the synchronizing means further comprises:

synchronizing operations on said LLP without a physical lock if it is determined that said requested log page is newly-allocated, the detecting means detects that an intermediate page of the log is being modified, or the detecting means detects that the LLP is being modified.

11. The computer program product of claim 8, wherein it is determined means further comprises:

a second determining means for enabling a processor to determine whether log page allocation is occurring at the node or task level.

12. The computer program product of claim 11, wherein the synchronizing means further comprises:

a second synchronizing means for enabling a processor to synchronize operations on said LLP through a Last Log Object Lock (LLOL) if it is determined that said requested log page is newly-allocated and it is determined that the log page allocation is occurring at the node level.

13. The computer program product of claim 11, wherein the synchronizing means further comprises:

a third synchronizing means for enabling a processor to synchronize operations on said LLP through an Append Log Semaphore if it is determined that said requested log page is newly-allocated, and it is determined that the log page allocation is occurring at the task level.

14. The computer program product of claim 13, wherein said Append Log Semaphore is one or more of a counting semaphore, a binary semaphore, a flag, a variable, or a mutex.

15. A system capable of improving physical lock acquisition for transaction logs, the system comprising:

a processor;

a receiving module configured to receive a request for a transaction log page;

a determining module configured to determine whether said requested log page is newly-allocated;

a detection module configured to detect when a last log page (LLP) is being modified;

a locking module configured to take a physical lock on said requested log page if it is determined that said requested log page is not newly-allocated and the detecting module detects that the LLP is not being modified; and a synchronization module configured to synchronize LLP operations without a physical lock if it is determined that said requested log page is newly-allocated or the detecting module detects that the LLP is being modified.

16. The system of claim 15, wherein the detection module is further configured:

detect when an intermediate page of the transaction log is being modified.

17. The system of claim 16, wherein the synchronization module is further configured to:

synchronize operations on said LLP without a physical lock if it is determined that said requested log page is newly-allocated, the detection module detects that an intermediate page of the log is being modified, or the detection module detects that the LLP is being modified.

18. The system of claim 15, wherein the determining module is further configured to:

determine whether log page allocation is occurring at the node or task level.

19. The system of claim 18, wherein the synchronization module is further configured to:

synchronize operations on said LLP through a Last Log Object Lock (LLOL) if it is determined that said requested log page is newly-allocated and it is determined that the log page allocation is occurring at the node level.

20. The system of claim 18, wherein the synchronization module is further configured to:

synchronize operations on said LLP through an Append Log Semaphore if it is determined that said requested log page is newly-allocated, and it is determined that the log page allocation is occurring at the task level.

\* \* \* \* \*